United States Patent
Sambi et al.

(10) Patent No.: US 11,601,428 B2
(45) Date of Patent: Mar. 7, 2023

(54) CLOUD DELIVERED ACCESS

(71) Applicant: Cisco Technology, Inc., San Jose, CA (US)

(72) Inventors: Muninder Sambi, Pleasanton, CA (US); Anand Oswal, Pleasanton, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 17/118,061

(22) Filed: Dec. 10, 2020

(65) Prior Publication Data

US 2022/0191199 A1 Jun. 16, 2022

(51) Int. Cl.
*H04L 12/22* (2006.01)
*G06F 21/71* (2013.01)
*H04L 9/40* (2022.01)
*H04L 12/46* (2006.01)
*H04L 12/813* (2013.01)
*G06F 12/109* (2016.01)

(52) U.S. Cl.
CPC ...... *H04L 63/0876* (2013.01); *H04L 12/4641* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,665,132 | B2* | 2/2010 | Hisada | H04L 9/006 709/227 |
| 8,776,166 | B1* | 7/2014 | Erickson | H04L 63/20 726/1 |
| 8,893,255 | B1 | 11/2014 | Martini | |
| 9,218,616 | B2 | 12/2015 | Van Biljon et al. | |
| 9,438,557 | B2 | 9/2016 | Chatterjee et al. | |
| 9,544,289 | B2 | 1/2017 | Ishaya et al. | |
| 9,730,269 | B2 | 8/2017 | Iyer et al. | |
| 10,701,108 | B2* | 6/2020 | Burrell | H04L 63/083 |
| 11,005,853 | B1* | 5/2021 | Agarwal | H04L 63/0807 |
| 2008/0028445 | A1* | 1/2008 | Dubuc | H04L 63/0892 726/5 |
| 2015/0381596 | A1* | 12/2015 | Johnson | H04L 63/029 718/1 |

(Continued)

OTHER PUBLICATIONS

A Framework for Managing User-defined Security Policies to Support Network Security Functions. Kim. ACM. (Year: 2018).*

(Continued)

*Primary Examiner* — Venkat Perungavoor
(74) *Attorney, Agent, or Firm* — Merchant & Gould P.C.

(57) ABSTRACT

Cloud delivered access may be provided. A network device may provide a client device with a pre-authentication virtual network and a pre-authentication address. Next, a policy may be received in response to the client device authenticating. The client device may then be moved to a post-authentication virtual network based on the policy. A post-authentication address may then be obtained for the client device in response to moving the client device to a post-authentication virtual network. Traffic for the client device may then be translated to the post-authentication address.

17 Claims, 3 Drawing Sheets

(56) References Cited

U.S. PATENT DOCUMENTS

| | | | | |
|---|---|---|---|---|
| 2016/0036857 A1* | 2/2016 | Foxhoven | ........... | G06F 12/0815 |
| | | | | 726/1 |
| 2017/0034129 A1* | 2/2017 | Sawant | ............... | H04L 63/0428 |
| 2017/0310709 A1* | 10/2017 | Foxhoven | ............. | H04L 63/102 |
| 2017/0373936 A1* | 12/2017 | Hooda | ................ | H04L 41/0816 |
| 2020/0396102 A1* | 12/2020 | Röglinger | ............... | H04L 41/22 |
| 2022/0201086 A1* | 6/2022 | Celiesius | ............ | H04L 12/4641 |

OTHER PUBLICATIONS

Dynamic Virtual Network Configuration between Containers using Physical Switch Functions for NFV Infrastructure. Nagakawa. IEEE. (Year: 2015).*
IP Based Security Architecture of Virtual Network in Cloud Computing System. Yang. IEEE. (Year: 2012).*
MAVIN: A MAC Address Coding Based Virtual Network Platform. Zhang. (Year: 2016).*

* cited by examiner

CLOUD DELIVERED ACCESS

TECHNICAL FIELD

The present disclosure relates generally to providing cloud delivered access.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
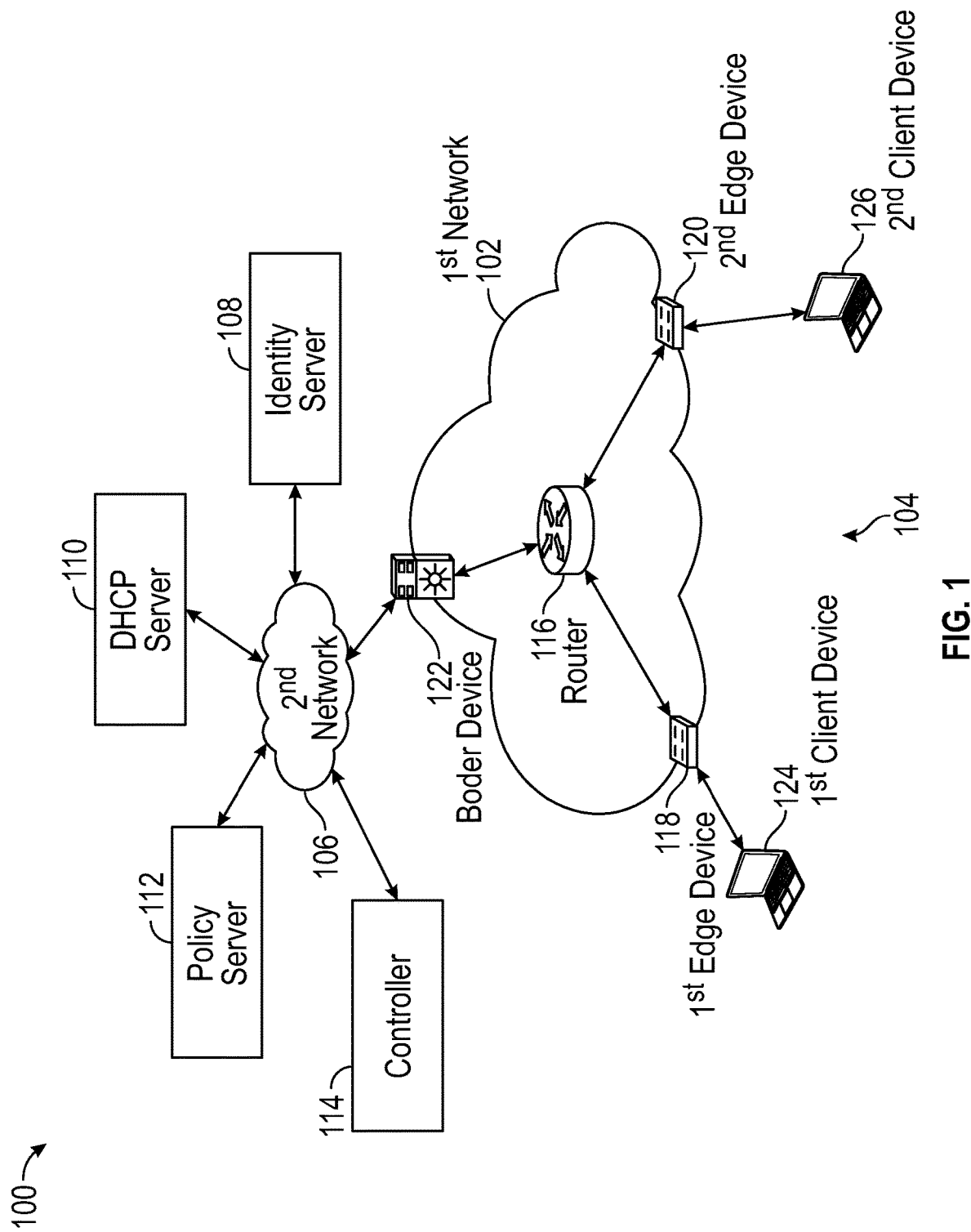
FIG. 1 is a block diagram of a system for providing cloud delivered access.

Cloud delivered access may be provided. A network device may provide a client device with a pre-authentication virtual network and a pre-authentication address. Next, a policy may be received in response to the client device authenticating. The client device may then be moved to a post-authentication virtual network based on the policy. A post-authentication address may then be obtained for the client device in response to moving the client device to a post-authentication virtual network. Traffic for the client device may then be translated to the post-authentication address.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The following examples describe a fabric network. However, this is an example and embodiments of the disclosure are not limited to fabric networks and may be used in conjunction with fabric or non-fabric campus networks for example.

A fabric network may comprise a network topology in which components pass data to each other through interconnecting network nodes (e.g., devices). Fabric networks may comprise an overlay and an underlay. The underlay deals with connectivity between fabric network devices and the overlay deals with user traffic transiting the fabric network. The fabric network overlay may comprise functional components such as Fabric Edge Devices (EDs or FEs), fabric intermediate devices, Fabric Border Devices (FBs or BDs), a Map Server (MS), and a fabric Control Plane (CP).

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices or hosts) may be attached to the FE devices. The end points may be in Endpoint Identification space where each endpoint may have an Endpoint Identifier (EID). Each device in the fabric network (e.g., FE devices and FB devices) may be configured with an address (e.g., a locator address). FE devices may register discovered EIDs (from the end points) with a fabric host-tracking database running on the MS associating the discovered EID to, for example, the configured locator address of the FE device that discovered it.

When a local FE device receives a packet from a local end point destined to a remote end point (i.e., on a remote FE device) whose location is not known (e.g., end points connected over the internet), the local FE device may send a map request message to the MS. The MS may have a border device registered as a provider of internet service. In that case, the MS may reply to a map request with a remote locator address that is an address of the internet service border. Once the local FE device receives a the reply message back from the MS associating the unknown EID to the remote locator address, all subsequent traffic from the local end point may be encapsulated (e.g., LISP encapsulated) and forwarded to the remote locator address (i.e., remote xTR device). Once the encapsulated packet is received on the remote xTR device, the remote xTR device may decapsulate the packet and forward natively (e.g., to the remote endpoint).

When a local FE device receives a packet from a local end point destined to a remote end point (i.e., on a remote FE device) whose location is not known at the local FE, the local FE device may send a map request message to the MS. The MS may have a remote end point registered with the Routing Locator (RLOC) of another remote FE. In that case, the MS may reply to a map request with a remote locator address that is an address of the remote FE. Once the local FE device receives a the reply message back from the MS associating the remote EID to the remote locator address, subsequent traffic from the local end point may be encapsulated (e.g., LISP encapsulated) and forwarded to the remote locator address (i.e., remote xTR device). Once the encapsulated packet is received on the remote xTR device, the remote xTR device may decapsulate the packet and forward natively (e.g., to the remote endpoint).

FB devices may connect the fabric network to the native routing domain. FB devices may be configured, for example, as LISP PxTR nodes and may provide a default gateway service to the FE nodes. Communication may happen through the FB device configured, for example, as a LISP PxTR node. When an FE device receives a packet from a local end point destined to a host outside the fabric network in the native routing domain, the FE device may encapsulate and send the packet to the FB device. The FB device may provide, for example, the LISP PxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnetwork to any part of the fabric network. For example, a subnetwork may be present across multiple FE devices with the same anycast gateway Internet Protocol (IP) address to allow for roaming by allowing endpoints to continue using the same gateway IP address. The provided services may also include Layer-3 overlay service and built-in mobility.

Embodiments of the disclosure may provide for a client device to come up in a cloud delivered access. In addition, with embodiments of the disclosure, switch ports may have no configuration before a client device joins and as soon as the client device disconnects, all previous knowledge may be forgotten thus keeping the network configuration dynamic.

Initially, a client device may receive an IP address in a default (e.g., pre-authentication virtual network). On identification, the client device may be moved to a proper virtual network (e.g., post-authentication virtual network) while maintaining the original IP address on the client device, but changing the IP address at the network edge because after authentication, the user may need to be moved to the proper virtual network (e.g., post-authentication virtual network).

FIG. 1 shows a system 100 consistent with embodiments of the disclosure for providing cloud delivered access. As shown in FIG. 1, system 100 may comprise a first network 102, a plurality of client devices 104, a second network 106, an identity server 108, a Dynamic Host Configuration Protocol (DHCP) server 110, a policy server 112, and a controller 114. First network 102 may comprise a plurality of network devices including, but not limited to, a router 116, a first edge device 118, a second edge device 120, intermediate network devices (not shown), and a border device 122. Plurality of client devices 104 may comprise a first client device 124 and a second client device 126. Second network 106 may comprise a network outside of first network 102, for example, a network to the cloud (e.g., the Internet).

Identity server 108, DHCP server 110, policy server 112, and controller 114 may comprise cloud based services. DHCP may comprise a network management protocol used to automate a process for configuring devices on Internet Protocol (IP) networks, thus allowing them to use network services such as Domain Name System (DNS), Network Time Protocol (NTP), and any communication protocol based on User Datagram Protocol (UDP) or Transmission Control Protocol (TCP) for example. Identity server 108 may provide Authentication, Authorization, and Accounting (AAA) that may comprise a framework for intelligently controlling access to computer resources, enforcing policies, auditing usage, and providing the information necessary to bill for services. These combined processes may be considered important for effective network management and security. Controller 114 may comprise a Digital Network Architecture Center (DNAC) controller (i.e., a Software-Defined Network (SDN) that may enable dynamic, programmatically efficient network configuration in order to improve network performance and monitoring, making it more like cloud computing than conventional network management.

The plurality of network devices in first network 102 may comprise, but are not limited to, switches and routers for example. First network 102 may comprise any number of network devices. Plurality of client devices 104 may comprise any number of client devices and is not limited to two. Each of plurality of client devices 104 may comprise any type device wishing to communicate over first network 102. For example, each of plurality of client devices 104 may comprise, but are not limited to, a Wi-Fi access point, a cellular base station, a tablet device, an Internet-of-Things (IoT) device, a mobile device, a smart phone, a telephone, a remote control device, a set-top box, a digital video recorder, a cable modem, a personal computer, a notebook computer, a network computer, a mainframe, a router, or other similar microcomputer-based device.

First network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., first network 102) through FE devices (e.g., first edge device 118 and second edge device 120). The traffic may be routed through first network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing Layer-2 and Layer-3 services on top of the underlay. The fabric network may have endpoints (e.g., plurality of client devices 104) connected to it.

First client device 124 and second client device 126 may respectively connect to first edge device 118 and second edge device 120 via a wired system or wirelessly through a wireless system comprising, but not limited to, WiFi, 4G, or 5G. First client device 124 and second client device 126 may comprise, but are not limited to, devices that may obtain services from identity server 108, DHCP server 110, policy server 112, and controller 114 for example. In a wired system, first edge device 118 and second edge device 120 may comprise switches for example. In a wireless system, first edge device 118 and second edge device 120 may comprise Wireless Local Area Network (LAN) Controllers (WLCs) with Access Points (APs) connected between the client devices and the WLCs for example.

The elements described above of system 100 (e.g., identity server 108, DHCP server 110, policy server 112, controller 114, router 116, first edge device 118, second edge device 120, border device 122, first client device 124, or second client device 126) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of system 100 may be practiced in a computing device 300.

Figure 2:
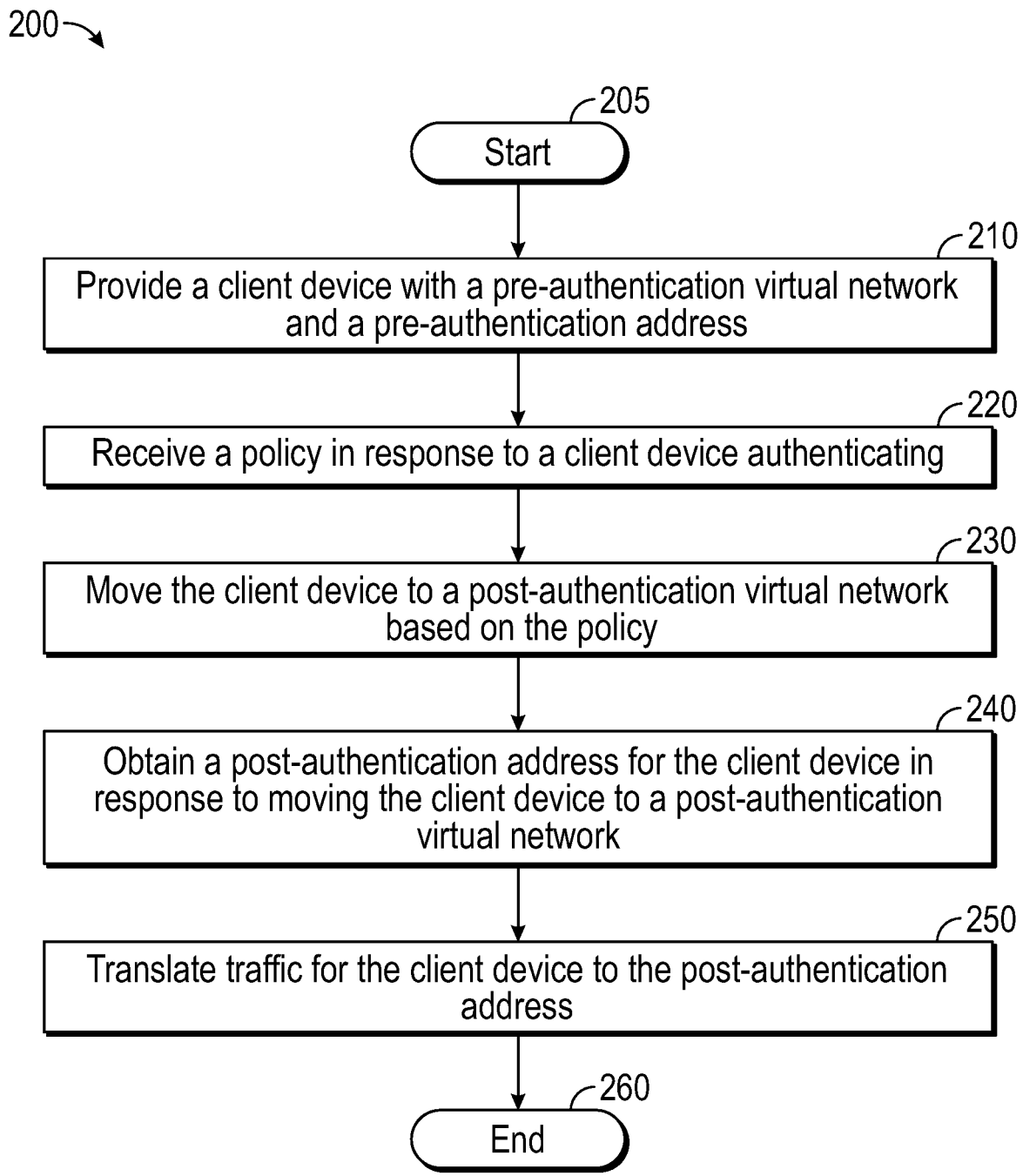
FIG. 2 is a flow chart of a method for providing cloud delivered access.

FIG. 2 is a flow chart setting forth the general stages involved in a method 200 consistent with an embodiment of the disclosure for providing cloud delivered access. Method 200 may be implemented using a networking device that may be embodied by a computing device 300 as described in more detail below with respect to FIG. 3. The networking device may comprise, but is not limited to, a switch or a WLC for example. Ways to implement the stages of method 200 will be described in greater detail below.

Consistent with embodiments of the disclosure, in order to communicate with identity server 108, first client device 124 may be given an IP address in a "default virtual network". After identification (i.e., post-authentication), first client device 124 may be moved to the right or proper virtual network while maintaining its original IP address on first client device 124. However, the IP address may be changed at the network (e.g., at the switch or WLC) because at post-authentication, first client device 124 may need to be moved from the default virtual network to the right or proper virtual network. For example:

Pre-Authentication Parameters:
Pre-Authentication virtual network: "default virtual network"; and
Pre-Authentication subnetwork: 10.0.0.0/8 or // DHCP relay to cloud//Post-Authentication Parameters:
Post-Authentication virtual network: "employee virtual network"; and
Post-Authentication subnetwork: 20.0.0.0/8. (This may not lead to a change on the client device IP address, this may be handled by the networking device (e.g., switch or WLC)).

Method 200 may begin at starting block 205 and proceed to stage 210 where the networking device (e.g., first edge device 118) may provide a client device (e.g., first client device 124) with a pre-authentication virtual network and a pre-authentication address. For example, first client device 124 may boot up and, by default, the ports on first edge device 118 may be in the default virtual network (i.e., the Pre-Authentication virtual network). First edge device 118, for example, may be configured to serve all users using subnetwork 10.0.0.0/8 (i.e., Pre-Authentication subnetwork). First client device 124 may send a DHCP_Discover message. First edge device 118 may relay it to DHCP server 110. In response, a DHCP_OFFER may come back from DHCP server 110 and first client device 124 may receive an IP address of 10.0.0.2/8 (e.g., in pre-authentication subnetwork 10.0.0.0/8). At this point, first client device 124 may only be allowed to access identity server 108. The Media Access Control (MAC) address and IP address for first client device 124 may be pushed to policy server 112 as well for any use in the future.

From stage 210, where the networking device (e.g., first edge device 118) provides the client device (e.g., first client device 124) with the pre-authentication virtual network and the pre-authentication address, method 200 may advance to stage 220 where the networking device (e.g., first edge device 118) may receive a policy in response to the client device authenticating. For example, a user may log into first client device 124 and may authenticate with identity server 108 (e.g., identity server 108 may be any of client identity or active directory.) The identity of the user may be notified to policy server 112 (e.g., a push or a pull mechanism may be used). Policy server may know first client device 124's IP address and MAC address from first edge device 118.

Policy server 112 may correlate the information that came from identity server 108 and information that came from first edge device 118. Once the correlation is done, policy server 112 may send the policy to first edge device 118. Controller 114 (e.g., cloud controller) may also be updated about the identity information of the user from identity server 108 and policy helper information may update any network parameters (e.g., [subnetwork and employee virtual network]) for this client device (e.g., first client device 124). If the subnetwork and employee virtual network are not present, controller 114 may create these on first edge device 118.

Once the networking device (e.g., first edge device 118) receives the policy in response to the client device authenticating in stage 220, method 200 may continue to stage 230 where the networking device (e.g., first edge device 118) may move the client device (e.g., first client device 124) to a post-authentication virtual network based on the policy. For example, first client device 124 may be moved to the new employee virtual network by using the policy. An example of the policy may be {match client_mac=AA set VRF=employee virtual network, though the VLAN remained the same as before}. Thus avoiding any change of IP for first client device 124 itself.

After the networking device (e.g., first edge device 118) moves the client device (e.g., first client device 124) to the post-authentication virtual network based on the policy in stage 230, method 200 may proceed to stage 240 where the networking device (e.g., first edge device 118) may obtain a post-authentication address for the client device (e.g., first client device 124) in response to moving the client device to the post-authentication virtual network. For example, as part of the instruction to first edge device 118, first edge device 118 may start a proxy-DHCP-client because a new client (e.g., first client device 124) may be seen in the employee virtual network. For "client_mac=AA", first edge device 118 using the proxy-DHCP-client basis may get an IP address in 20.0.0.0/8 subnetwork, for example, 20.0.0.2/8. First client device 124 does not do a DHCP-Discover, rather first edge device 118 sent the DHCP-Discover on behalf of first client device 124.

From stage 240, where the networking device (e.g., first edge device 118) obtains the post-authentication address for the client device (e.g., first client device 124) in response to moving the client device to the post-authentication virtual network, method 200 may advance to stage 250 where the networking device (e.g., first edge device 118) may translate traffic for the client device (e.g., first client device 124) to the post-authentication address. For example, any traffic coming from first client device 124 (IP address 10.0.0.2) may be translated to 20.0.0.2 in this example. When first client device 124 sends a DHCP renew for 10.0.0.2, first edge device 118 may correspondingly generate a DHCP renew for 20.0.0.2.

First client device 124's IP address is 10.0.0.02 in this example. Its translated IP address of 20.0.0.2 may be registered in the cloud control plane (e.g., with controller 114) so that on roaming, this can be seamlessly moved to a new switch (e.g., if first client device 124 were to move to second edge device 120). On roaming, the translation may move from one switch to another switch using the control plane.

In case first client device 124 disconnects, then on the expiry of the DHCP timer, the switch may release the post-authentication IP address (in this example, 20.0.0.2). Thus, the clean-up may be performed at DHCP server 110. Once the networking device (e.g., first edge device 118) translates traffic for the client device (e.g., first client device 124) to the post-authentication address in stage 250, method 200 may then end at stage 260.

Consistent with embodiments of the disclosure, network device ports may not carry a static configuration at any point in time and may be dynamic. A removal and addition of a network device (e.g., a switch) as well as a client device may comprise a seamless operation in the branch. Furthermore, with embodiments of the disclosure, the second (i.e., post-authentication) IP address that the network device obtained by DHCP-proxy, may not be known to the client device thus making it simple for the client device to be moved to a new virtual network (e.g., default virtual network to employee virtual network or to a "quarantine virtual network") seamlessly.

Figure 3:
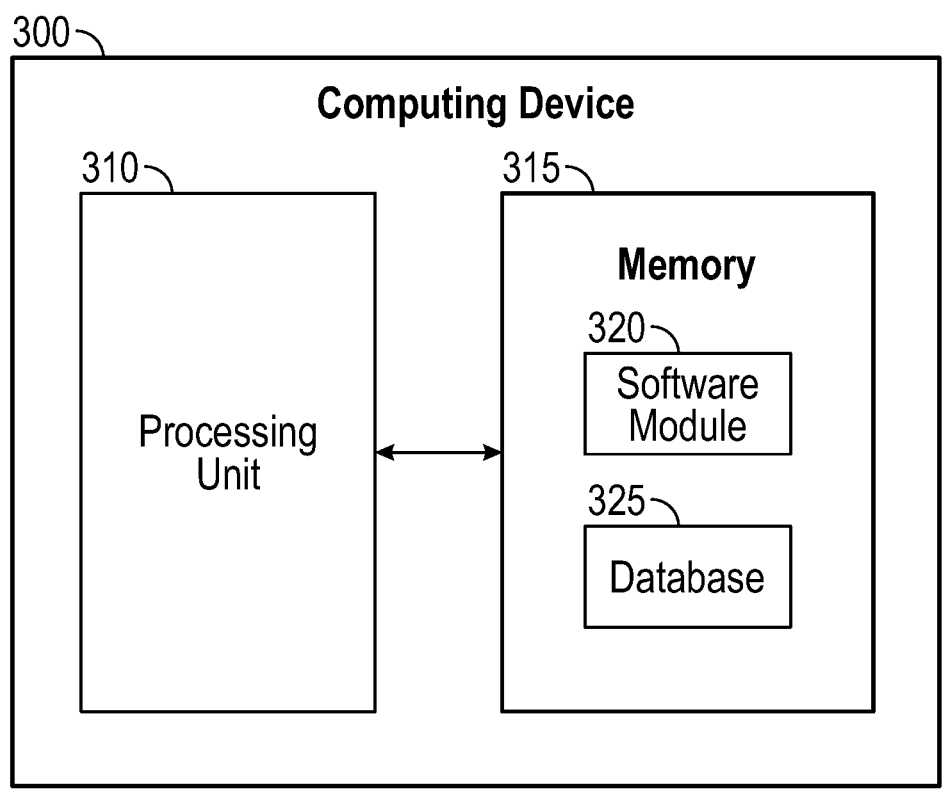
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing cloud delivered access as described above with respect to FIG. 2. Computing device 300, for example, may provide an operating environment for identity server 108, DHCP server 110, policy server 112, controller 114, router 116, first edge device 118, second edge device 120, border device 122, first client device 124, or second client device 126. Identity server 108, DHCP server 110, policy server 112, controller 114, router 116, first edge device 118, second edge device 120, border device 122, first client device 124, or second client device 126 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   providing, by a network device, a client device with a pre-authentication virtual network and a pre-authentication address;
   receiving a policy in response to the client device authenticating wherein the policy is selected by a policy server based on identity information received from an identity server in response to the client device authenticating and from the pre-authentication address of the client device and a Media Access Control (MAC) address of the client device received from the network device;
   moving the client device to a post-authentication virtual network based on the policy;
   obtaining a post-authentication address for the client device in response to moving the client device to the post-authentication virtual network; and
   translating traffic for the client device to the post-authentication address.

2. The method of claim 1, wherein a port on the network device to which the client device is connected, by default, is in the pre-authentication virtual network using a pre-authentication subnetwork for which the pre-authentication address is within.

3. The method of claim 1, wherein obtaining the post-authentication address comprises obtaining the post-authentication address by the network device on behalf of the client device.

4. The method of claim 1, further comprising sending a renew, by the network device, for the post-authentication address in response to the client device sending a renew for the pre-authentication address.

5. The method of claim 1, wherein the network device comprises a switch.

6. The method of claim 1, wherein the network device comprises a Wireless Local Area Network (LAN) Controller (WLC).

7. A system comprising:
   a memory storage; and
   a processing unit coupled to the memory storage and disposed in a networking device, wherein the processing unit is operative to:
   provide a client device with a pre-authentication virtual network and a pre-authentication address;
   receive a policy in response to the client device authenticating;
   move the client device to a post-authentication virtual network based on the policy;
   obtain a post-authentication address for the client device in response to moving the client device to the post-authentication virtual network;
   translate traffic for the client device to the post-authentication address; and
   send a renew for the post-authentication address in response to the client device sending a renew for the pre-authentication address.

8. The system of claim 7, wherein a port on the network device to which the client device is connected, by default, is in the pre-authentication virtual network using a pre-authentication subnetwork for which the pre-authentication address is within.

9. The system of claim 7, wherein the processing unit being operative to obtain the post-authentication address comprises the processing unit being operative to obtain the post-authentication address by the network device on behalf of the client device.

10. The system of claim 7, wherein the network device comprises a switch.

11. The system of claim 7, wherein the network device comprises a Wireless Local Area Network (LAN) Controller (WLC).

12. A non-transitory computer-readable medium that stores a set of instructions which when executed perform a method executed by the set of instructions comprising:
   providing, by a network device, a client device with a pre-authentication virtual network and a pre-authentication address;
   receiving a policy in response to the client device authenticating wherein the policy is selected by a policy server based on identity information received from an identity server in response to the client device authenticating and from the pre-authentication address of the client device and a Media Access Control (MAC) address of the client device received from the network device;
   moving the client device to a post-authentication virtual network based on the policy;
   obtaining a post-authentication address for the client device in response to moving the client device to the post-authentication virtual network; and
   translating traffic for the client device to the post-authentication address.

13. The non-transitory computer-readable medium of claim 12, wherein a port on the network device to which the client device is connected, by default, is in the pre-authentication virtual network using a pre-authentication subnetwork for which the pre-authentication address is within.

14. The non-transitory computer-readable medium of claim 12, wherein obtaining the post-authentication address comprises obtaining the post-authentication address by the network device on behalf of the client device.

15. The non-transitory computer-readable medium of claim 12, further comprising sending a renew, by the network device, for the post-authentication address in response to the client device sending a renew for the pre-authentication address.

16. The non-transitory computer-readable medium of claim 12, wherein the network device comprises a switch.

17. The non-transitory computer-readable medium of claim 12, wherein the network device comprises a Wireless Local Area Network (LAN) Controller (WLC).

* * * * *